INVENTOR.
ROBERT H. THORNER
BY
ATTORNEYS

Aug. 28, 1962    R. H. THORNER    3,051,139
FLUID POWERED GOVERNOR OR CONTROLLER
Filed June 23, 1958    2 Sheets-Sheet 2

INVENTOR.
ROBERT H. THORNER
BY
ATTORNEYS

United States Patent Office 3,051,139
Patented Aug. 28, 1962

3,051,139
FLUID POWERED GOVERNOR OR CONTROLLER
Robert H. Thorner, 19754 Monte Vista, Detroit 21, Mich.
Filed June 23, 1958, Ser. No. 743,542
38 Claims. (Cl. 121—42)

The present invention relates primarily to a fluid powered speed governor for any machine or prime mover such as for a diesel, gas, steam, or atomic engine, etc., and includes a controlling system which may also be used for sensing and regulating any controlled condition such as temperature, velocity, position, fluid pressure, fluid level, humidity, etc. The present application is a continuation-in-part of my co-pending patent applications, Serial No. 683,318, filed September 11, 1957 for "Fluid Pressure Sensing Governor Mechanism"; Serial No. 567,270, filed February 23, 1956, for "Engine Governor," now Patent No. 2,887,998; Serial No. 291,381, filed June 3, 1952, for "Fluid Operated Speed Governor," now Patent No. 2,995,898; and Serial No. 687,241, filed September 30, 1957, for "Governor Device."

Governors currently in use for controlling the speed of a prime mover, such as a diesel engine, are mostly of the servo-mechanism type having oil powered servo-motors controlled by a pilot valve actuated by a centrifugal flyweight mechanism. The pilot valve usually comprises a spool slidable in a bore to cover or uncover ports that direct pressure oil from a source to the servo-motor and/or permits oil to drain from the servo-motor as required in normal speed regulating movements. For precision or "isochronous" (constant speed at all loads) governors, the presently known devices provide a pilot valve action in which the valve must always be in a fixed or neutral axial position to hold a given set speed; and for changes in speed the pilot valve must deviate or make "excursions" away from its neutral position to provide intermittent fluid forces on the servo-motor tending to restore the speed, whereupon the pilot valve returns to its neutral position. With this type of controller system, a so-called "speeder-spring" balances the pilot valve position against the centrifugal force of the flyweights. Since the system is balanced in only one axial position which occurs at only one force of the speeder spring for a set position of the speeder-spring-control-lever, the flyweights will balance this force at only one speed. Hence, the governor is inherently isochronous at each position of the speeder-spring-control lever, but provides a different isochronous speed at each different position of the control lever.

The governor described thus far, although isochronous, also tends to be inherently unstable for several reasons. Firstly, the pilot valves conventionally used are non-modulating and produce a sudden increase in pressure on the servo-motor when the pilot valve moves away from its balanced neutral position. This action causes the servo-motor to "get ahead" of the movement of the pilot valve or to "overcontrol" the engine which produces surging. Secondly, this overcontrol is made worse because of the relatively large mass of the pilot valve and flyweights, which mass affects the speed of response of the elements and thus the correcting return movement to "catch" the servo-motor in time to prevent excessive overcontrol. But, thirdly, one of the most important factors contributing to such overcontrol of the servo-motor is the static and dynamic friction in the flyweight and pilot valve, as well as its compensating system, which cause minute delays in the speed correcting action thereof.

In present governors the inherent instability above described is overcome by the addition of "compensating" systems. These systems usually comprise a piston operated by the servo-motor to apply a temporary oil pressure (by bleeding trapped oil) acting on another piston connected directly or through a spring to either the pilot valve itself, or to an axially movable sleeve having ports cooperating with the pilot valve, or to a lever connected to the pilot valve, all in a manner well known to those skilled in the art. The action is such that when the pilot valve deviates from its neutral position and the servo-piston first moves to restore the engine speed, an oil pressure is produced (on the pilot valve or its sleeve) to instantly return the pilot valve to a neutral position in relation to its sleeve which stops further movement of the servo-motor. An adjustable delay bleed is provided to permit this temporary pressure to dissipate; then the pilot valve can deviate again from its neutral position to cause another "step" movement of the servo-motor, and so on, until the speed is corrected. This action causes the servo-motor to move in fast incremental "steps" to prevent overcontrol, and stability is achieved since in each step a temporary speed droop is produced. To set the governor, the opening of the delay bleed is increased until the engine surges and is then closed sufficiently to stop the surging.

Such compensating systems have several undesirable characteristics. The above described compensating "step" action tends to slow down the movement of the servo-motor and thus causes a speed deviation with a sudden change in load. The more the delay bleed must be closed, the slower will be the servo-motor action and the greater will be the speed deviation produced with a sudden change in load. It is recognized that the lower the mass and friction of the pilot valve and flyweight, the less compensation is necessary and as a result the delay bleed need not be so restrictive. To this end, present governors have their pilot valves, flyweights, compensating pistons or sleeves, etc., made of hardened precision-ground materials with anti-friction bearings used freely throughout. Also, in many instances the pilot valves and compensating pistons or sleeves are mechanically rotated by added driving mechanism in an attempt to reduce friction. These expedients do not eliminate the problems but merely reduce their effect. The pilot valves and compensating pistons of conventional governors have clearances measured in ten-thousandths of an inch, and their rotation not only requires complex and costly added mechanism but still are subjected to the surface tension of the oil in speed-responsive movements. Much worse, one of the main problems of such hydraulic governors is the deposit of gun or dirt particles which form between the close-fitting surfaces of the pilot valve or compensating piston and their respective sleeves, thereby making the movement of the parts somewhat erratic and reducing the reliability of the governors.

Substantially the same problems exist in the regulation of other controlled conditions, such as temperature, velocity, pressure, position of a member, etc., and the same expedients used for the improvement and refinement of speed governors are used in such other "closed loop" control devices.

An object of the present invention is to provide a speed governor, or a control apparatus to regulate any controlled condition, in which all of the above recited objections are eliminated by providing a combination of elements including a completely frictionless pilot valve and its actuating means and a frictionless compensation system acting on the pilot valve, and in which close fitting surfaces of all elements responding to the speed or other sensing signals are completely eliminated, and which speed responsive elements are of lower mass than heretofore possible, thereby reducing inertia effects.

Another object of the invention is to provide a compensating means for a governor or control mechanism of the above type which will effectively prevent an over-travel movement of a governor servo-motor in response to movement of a pilot valve, the compensating means being instantly responsive to movement of a portion of the servo-motor.

A special object of the present invention is to provide a novel clock-type speeder spring construction to provide a low biasing rate but providing a larger speed range than heretofore possible.

Further objects and advantages of the invention will be apparent from the following description, taken in connection with the appended drawings, in which FIG. 1 is a somewhat diagrammatic, sectional view of a governor embodying the present invention;

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In accordance with the invention, I achieve the desired objects by providing a frictionless speed sensing means, such as by the frictionless leaf spring flyweight and leaf spring supported pilot valve all disclosed in my patent application Serial No. 687,241, in combination with a compensating device comprising a leaf-spring-supported disc acting through a spring on the pilot valve and having perimetrical clearance to avoid friction. The compensating device is responsive to temporary fluid pressure produced by a piston, or the like, operatively connected to the servo-motor piston. I provide a novel clock-type speeder spring acting on the pilot valve and being windable to provide speed selection in such a manner that the coils of the clock spring are prevented from touching each other. This desirable result is accomplished by a piece of wire, a leaf spring, or knife-edge member, operatively connected to the outer coil of the spring adjacent to its contact with the pilot valve, which construction also accommodates swinging movements of the pilot valve on its leaf springs. For selectable normal or even reverse permanent speed-droop, I have included an adjustable cam operatively connected to the servo-motor to act on a spring connected to the pilot valve to vary the regulated speed as a function of load in those cases where the invention is used as a speed governor, or to vary the controlled condition as a function of the movement of the controlling member in a broader sense.

While the present invention is described with reference to its application on an internal combustion (diesel) engine as a governor regulating the speed thereof, it will be understood that the invention is not limited thereto, and that it is fully applicable to other installations such as gas engines, steam engines, or gas turbines, etc. My improved governor or controller may also be used for regulating other devices in response to speed, or in response to any controlled condition, as will be described.

Basic Governor Construction

Figure 1:
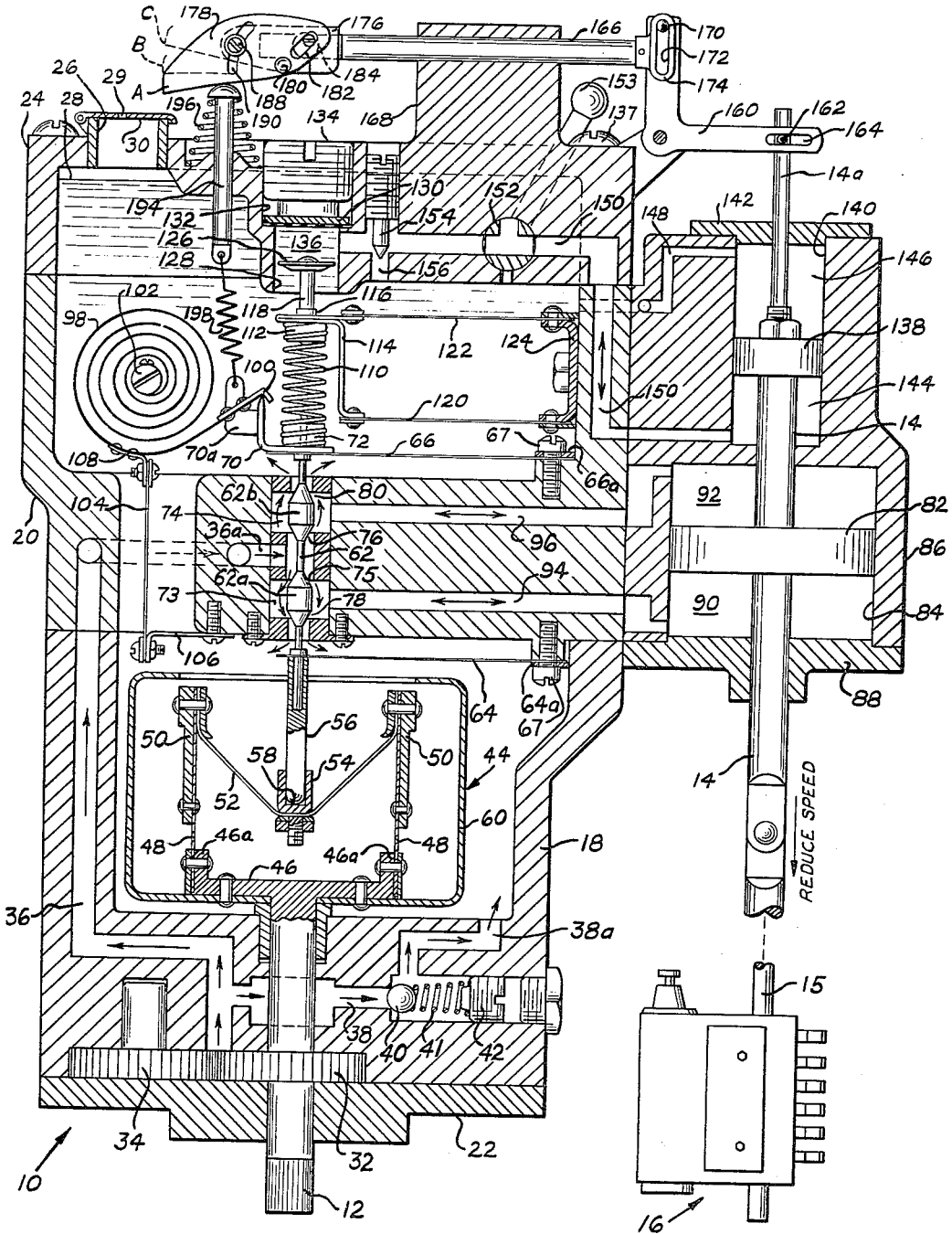
Figure 2:
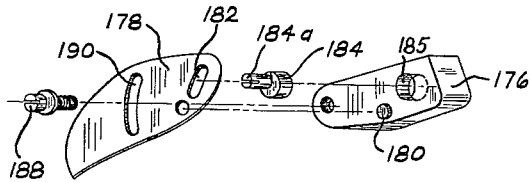
FIG. 2 is an exploded perspective view of a speed droop cam and its adjustment mechanism as used in the present invention.

In the drawings there is shown by way of example one governing mechanism embodying the present invention. Referring specifically to FIGS. 1 and 2, the governor 10 shown therein is illustrated as including an input shaft 12 operatively connected to be driven by a member rotating as a function of the speed of a diesel engine (not shown) and an output shaft 14 of the governor is operatively connected to transmit axial movements of the shaft to regulate the fuel metering rack 15 of a fuel pump 16 of the engine being controlled. The governor, as illustrated, comprises a flyweight section 18 suitably joined to a control section 20 and sealably enclosed by an end wall 22 and a cover block 24. If the governor uses oil as a working fluid, oil is admitted through an oil filler 26 to a level near the top, as at 28. This oil is vented to the atmosphere through a vent 29 in the oil filler cover 30 as shown, and hence shall be referred to as "sump" oil. Any fluid, such as air, may be used as the power medium in the governor providing the sizes of the various elements are arranged to suit.

The shaft 12 rotates a gear 32 cooperating with an idler gear 34 to provide a conventional gear pump having an inlet passage (not shown) for taking in sump oil at substantially atmospheric pressure. The pump delivers pressure oil through its outlet passage 36 to the pilot valve of the governor for operation to be described. The pressure of the oil at conduit or passage 36a is controlled by a regulator in a by-pass conduit 38, which also subjects the shaft 12 to pressure lubrication, if desired.

The pressure regulator illustrated in FIG. 1 comprises a ball 40 cooperating with its seat to control the by-pass flow through conduits 38 and 38a to the sump. The ball is biased by a spring 41 whose force is set by an adjusting screw 42 to select the desired pressure, such as 75 to 100 p.s.i., for example. Any other source of fluid, such as air or oil under pressure or vacuum, may be supplied to passage 36a in place of the oil from the gear pump illustrated in FIG. 1. Accordingly, it is to be understood that when the term "pressure fluid circuit" is used in the specification and claims, it refers either to vacuum or positive pressure.

The shaft 12 carries means to produce a force varying as a function of the rotary speed thereof. In the example illustrated in FIG. 1, a frictionless centrifugal flyweight device 44 of the type disclosed in my co-pending application, Serial No. 687,241 is shown. This flyweight device comprises a base member 46, either secured to or made as a part of the shaft 12, which includes upturned ends 46a carrying a pair of leaf springs 48 suitably secured thereto. The leaf springs 48 carry a pair of flyweights 50 which are joined by a frictionless flexible strip or string-like material such as a piece of spring wire 52 of generally U-shape suitably secured to the weights. The wire has secured thereto at its central portion a force transmitting cup 54 having a cylindrical bore for rotation about a rod or cylindrical shaft 56. The shaft is constrained from rotation by leaf spring means to be described and has a rounded or pivot end 58 for abutting contact with the bottom or end of the bore of cup 54. Rotation of shaft 12 causes weights 50 to produce a force and move radially outward to impart an upward force on (and movement of) the cup 54 tending to move shaft 56 axially in an upward direction, as viewed in FIG. 1. The bending action of the leaf springs 48 and wire 52 is frictionless; also any eccentricity of shaft 56 with respect to shaft 12 is accommodated by longitudinal and torsional bending of the wire 52. In this manner, the production and transmission of axial forces and movements to the shaft 56 is without friction irrespective of production variations. If the flyweights are submerged in the oil, as illustrated, a cup 60 which is suitably secured to the base 46 for rotation therewith may be provided to remove the effect of oil-impact on the flyweights, unless this effect is to be utilized as disclosed in my copending application Serial No. 687,241. A more detailed explanation and operation of the flyweight mechanism is made in my said co-pending application Serial No. 687,241, and hence will be omitted from this disclosure.

The rod or shaft 56 is suitably secured, as by pressing or soldering to a pilot valve 62, and is carried thereby. The pilot valve is supported for frictionless axial swingable movements by a pair of substantially parallel leaf springs 64 and 66 suitably secured to the control section at one end thereof by screws 67. The free end of leaf spring 64 is clamped between the shaft 56 and a flange of the pilot valve and may be soldered or otherwise fixed in place. The free end of the leaf spring 66 is clamped between a bracket 70 and another flange of the pilot valve, and is secured by a press-fitted spring retainer 72; and if desired, the entire assembly may be securely fastened, as by solder, and the assembly may be slip fitted over the extension of pilot valve 62, shown in dotted lines.

The pilot valve includes two valves body members 62a and 62b suspended within chambers 73 and 74, respectively. Each valve body has a pair of opposite conical faces for cooperating with two fluid inlet orifices 75 and 76 and fluid outlet orifices 78 and 80 to form four variable restrictions, such that each of chambers 73 and 74 are provided with inlet and outlet variable restrictions, or valves. Pressure oil from passage 36a divides into two paths or branches of the circuit, so that one oil path flows past inlet orifice 75 into chamber 73 and out of sump oil past orifice 78; and in the second oil path or branch the oil flows from passage 36a past inlet orifice 76 into chamber 74 and to the sump past orifice 80. Thus, when the pilot valve moves upwardly, as viewed in FIG. 1, the apertures of orifices 75 and 80 gradually reduce while the apertures of orifices 76 and 78 gradually increase. This action causes the pressure in chamber 73 to gradually decrease while the pressure in chamber 75 gradually increases. A downward movement of the pilot valve produces a reverse change of the pressures. Thus the pressure in chambers 73 and 74 may be modulated to vary oppositely and gradually from the value of the source pressure in passage 36a to the value of the sump pressure, and when the pilot valve is substantially in its mid-position, the pressures in chambers 73 and 74 are substantially equal. The construction details of leaf springs 64 and 66 in cooperation with the pilot valve 62 and the anti-torque members 64a and 66a to provide perfect axial alignment with respect to the two seating orifices 78 and 80, respectively (the center two orifices being slightly larger than the valve bodies), are disclosed in detail in my Patent No. 2,737,165 for a "Governor Device," issued March 6, 1956.

The shaft 14 which may be termed the governor "output shaft" is actuated by a servo-motor piston 82, or other similar pressure responsive member, slidable in a bore 84 of a cylinder in block 86 which is secured to the control section. The servo cylinder is closed by an end wall 88 and is divided by the piston 82 to form two fluid chambers 90 and 92 which communicate through large passages 94 and 96 with chambers 73 and 74, respectively. Hence, the pressures existing in chambers 73 and 74 are transmitted to chambers 90 and 92, respectively, so that an upward movement of the pilot valve causes a downward movement of the servo-motor piston 82, and conversely.

The pilot valve is biased by a spiral or clock-type speeder spring 98 which acts downwardly on the valve to oppose and balance the forces produced by the flyweight mechanism. The end of the clock spring carries an L-shaped member 100 suitably secured thereto, or similar means, for cooperating with a knife-edge end of the bracket 70 carried by the pilot valve. The inner turn of the spiral spring is supported by a slotted shaft 102 rotatable by a convenient knob or lever extending outwardly from the casing (not shown). Clockwise rotation of the shaft 102, as viewed in FIG. 1, causes the spring to wind and apply a greater downward force on the pilot valve, and unwinding the spring reduces the force applied to the pilot valve.

With only a conventional clock spring, if the spring were wound, the reacting force of the pilot valve would cause the lower turns of the coils, as viewed in FIG. 1, to move upwardly until the coil turns touched each other. This contact would produce friction in the spring. It is desirable to avoid any such friction in any of the speed sensing parts. Therefore, the present invention includes means to hold the coil turns apart. To this end a piece of frictionless flexible strip or string-like material such as a piece of wire 104, cord, or its equivalent, such as a leaf spring or knife edge member, is secured to the outer coil turn at one end and to a fixed support 106 at its other end. The wire 104 is secured to a bracket 108, or the like, by suitable means as by screws, and the bracket is secured to the clock spring by suitable means as by rivets, soldering, spot welding, etc. The support 106 is secured to the lower portion of the control section 20, as by screws. With this novel construction, the lower coils of the clock spring are prevented from rising, as viewed in FIG. 1, so that the spring can be wound through a much greater angular travel without the coil turns touching each other. The second function of the wire 104 is to accommodate without friction the slight swinging movements or other deviations of the pilot valve 62 as it moves axially in a slightly arcuate path on its supporting leaf springs 64 and 66.

Although any type of speeder spring may be used to apply a biasing force to the pilot valve, the clock spring construction as described above provides a low spring rate throughout a wide range of governed speeds. By contrast, if a conventional helical coil spring is used for the speeder spring and is of low rate, the range of governed speeds is very low. It is desirable to have the lowest possible spring rate without surging and to have the pilot valve move as far as possible from its mid-position for a given change in engine speed in the operation of the governor to be described. The possible degree of reduction in rate depends on the type of stability compensation employed as will be discussed. Another advantage of the clock spring installed as above described as I have found in practice, is that by proper selection of the thickness of the material and the number of coil turns, a variable rate may be produced to correspond closely with the increase in the rate of the force developed by the flyweight device as the speed increases. This variation of speed with force acting on the pilot valve by means of the flyweight device is substantially a square function.

Stability compensation for the governor may be achieved in several ways. In the form shown in FIG. 1, a compensating spring 110 is operatively connected at its ends by suitable means to retainers 72 and 112. A bracket 114 is secured against a flange 116 of a shaft 118 projecting through the retainer 112 and upset or otherwise secured such that the retainer, shaft, and bracket are securely held together. A pair of leaf springs 120 and 122 are secured at one of their ends to the bracket 114, as by rivets, and at their other ends to a U-shaped bracket 124 also by rivets, or by other suitable fastening means. The bracket 124 is fastened to the inner wall of the control section.

The shaft 118 has secured to its upper end, by upsetting or other suitable fastening means, a cylindrical compensating disc 126 or its equivalent having predetermined perimetrical clearance with respect to a bore or cylinder 128 in the cover block 24. With this construction, the compensating disc is supported by the leaf springs 120 and 122 to move axially without friction since the disc never touches the walls of cylinder 128. A sealing plug 130 is pressed against a suitable gasket in a bore 132 by a threaded retainer 134 to form an oil chamber 136 above the disc 126, as viewed in FIG. 1 and the disc forms a movable portion of a wall of the chamber 136. Production variations such as slight eccentricities are compensated for by providing oversize holes for the cover screws 137. The assembly is made without the retainer 134 and plug 130, and its gasket. The cover block 24 is then placed on top of the control section with the disc 126 in place. The screws 137 are tightened to only a light force and the cover block is then tapped sideways until the clearance around disc 126 is substantially uniform, and then the screws are made tight, and plug 130 and retainer 134 are then inserted.

A compensating piston 138, which also may be a metallic or synthetic rubber diaphragm, or a metallic disc to be described, is suitably secured to the upper end of the servo-motor shaft 14. The piston is slidable in a bore 140 of a cylinder and is enclosed by an end wall 142 to form two oil chambers 144 and 146. The upper chamber 146 is always vented to sump oil by means of a passage 148 which is sufficiently large to maintain atmospheric sump pressure in chamber 146 at all times. A large unrestricted passage 150 connects chamber 144 with chamber 136. A valve 152 controlled by a lever 153, or the like, may optionally be provided in passage 150 for purposes to be described. A threaded adjustable needle compensating valve 154 is provided to control the flow of fluid past the conical face of the valve and its seat and out to sump through a passage 156 in parallel with the flow of fluid through the clearance around the disc 126. The oil level 28 is maintained near the top of the governor as shown so that chambers 144 and 136 as well as passages 150 and 156 are always completely submerged and filled with oil.

The leaf springs 48, 64, 66, 120, and 122 as well as the clock spring 98 and wires 52 and 104 may be made of any spring material such as stainless steel, or Phosphor-bronze. For best fatigue resistance beryllium-copper is desirable. For the supporting leaf springs, any other sheet material having consistent elasticity may also be used. Strips of such stock have very small resistance to bending perpendicularly to their plane but offer very high resistance to bending within their plane, and more important, are consistent in their action so they are frictionless in operation. Any of the V-type or cross-type leaf springs disclosed in my Patent No. 2,808,042, issued October 1, 1957, and in my said co-pending application Serial No. 687,241, may be used in place of the supporting leaf springs disclosed herein. The clock spring 98 or any or all of the leaf springs 48, 64, or 66 may be made of bimetal to compensate for any errors produced by changes in the temperature of the oil or in the spring forces of the speeder spring.

In the specifications and claims herein, all supporting leaf springs and wires associated with the pilot valve, flyweight, compensation system, or speeder spring are referred to as "substantially" frictionless. These spring elements actually are completely frictionless from a practical standpoint, since in extensive tests of the pilot-valve-action by itself when supported by leaf springs, no lag or hysteresis could be measured that would affect the governing action. Any intermolecular friction in the material itself can, of course, be disregarded, since it is immeasurably small. The term "substantially" has been used solely in recognition of this minute intermolecular friction.

Operation of Basic Governor

If the governor is made with only the mechanism thus far described, its operation will be isochronous. The remaining mechanism shown in FIG. 1 is to provide a positive or negative speed-droop which is required only for certain applications, and will be discussed separately hereinafter.

The operation of the basic governor as described thus far is as follows: When the engine is accelerated from idle toward the preset governed speed the fuel rack 15 remains in the full-load position since the pilot valve is in a downward position. When the governed speed is attained, the weights 50 produce enough force on pilot valve 62 to move it temporarily upwardly to balance the force of the speeder spring 98 which causes the piston 82 and shaft 14 to start moving downwardly. This action causes the pilot valve to move toward its neutral position until the pressures in chambers 90 and 92 are substantially equal so that the governor seeks stability at the operating load and governed speed.

Now assuming the pilot valve is in a neutral position, as the speed tends to increase due to a load decrease the weights 50 move outwardly to move the pilot valve upwardly which increases the pressure in chamber 92 and decreases the pressure in chamber 90. This pressure differential causes the piston 82 to start to move downwardly and reduce the engine speed. This action also moves the piston 138 downwardly to force oil out through passage 156 and through the clearance around the disc 126. Until all the oil moved by piston 138 escapes through these two bleed outlets, a temporary pressure is produced in chamber 136. This pressure causes the disc 126, which forms a movable wall of the chamber 136, to move downwardly to compress the spring 110 and add a temporary force on the pilot valve tending to move it back to its neutral position and stop movement of the piston 82. If, after this small "step" correction, the engine speed is still above the governed value, the pilot valve again moves up so that the piston 82 moves downwardly another "step" to reduce the speed further while the piston 138 and disc 126 cause the pilot valve to return to its neutral position and stop the piston 82. These very fast but small "steps" continue until the governed speed is restored.

If the speed tends to decrease due to a load increase, the weights 50 move inwardly so that the speeder spring 98 moves pilot valve 62 downwardly and pistons 82 and 138 move upwardly to increase the speed. The "step" compensating action is the reverse of the foregoing in which the piston 138 applies a temporary vacuum to disc 126 tending to stretch spring 110 for neutralizing the position of the pilot valve. If air is used as the working fluid, then the piston 138, or its equivalent, will probably be of larger diameter to provide sufficient compensation. The compensating needle is adjusted to the maximum opening without surging for any given engine. In practice, the movement of piston 82 is so fast that the pilot valve acts temporarily as it would with a permanent speed-droop only until the pressure on disc 126 dissipates. Thus, the "steps" approach infinity, so that the stabilizing action is smooth.

Due to the large area of the piston 82 and the relatively high pressure of the fluid available in supply passage 36a, the forces produced by the servo-motor piston are very large in relation to the initial signal forces produced by the centrifugal flyweight device 44, so that any friction in the fuel control means and its linkage may be neglected.

In any speed regulating mechanism, or similar "open-loop" control device, it is highly desirable that the friction of all the elements which move in response to speed (and other elements that act thereon) be minimized, or at best entirely eliminated. The total of all these elements that move together in response to speed-changes might be termed the "speed sensing mechanism," and in the control device of the present invention are frictionless in their speed-responsive movements, including all their connections. These elements of the speed-sensing-mechanism are the leaf springs 48, weights 50, wire 52, connection 58, bar 56, pilot valve 62 and its supporting springs 64 and 66, knife edge bracket 70, clock spring 98 and its wire 104, compensating spring 110, bracket 114, leaf springs 120, 122, and disc 126. Because of the frictionless character and low mass of these elements in their cooperative action, the sensing movements of the flyweights and pilot valve and the compensating movements acting thereon are extremely fast and, more important, consistent with no measurable lag. Hence the speed deviation accompanying a change in load is much less than for conventional governors of this type, so that the compensating needle can be set at a large opening without surging, all other factors being the same. The characteristic is further enhanced by the modulating nature of the pilot valve in which the pressure differential "across" the piston 82 gradually increases as the pilot valve gradually deviates from its mid-position, thus reducing the tendency for overcontrol. Equally important, none of the elements of the sensing mechanism of my governor, such as the pilot valve and compensating disc 126 (in place of the usual piston) require close fits against mating sliding surfaces. Hence, gum and dirt cannot wedge in the clearances between these surfaces to cause malfunctioning of the governor. In my governor the clearances around the bodies 62a and 62b can be very large, such as ¼" radially, and the clearance around the disc may be large, such as .010"–.020" diametrically by making the piston 138 sufficiently large. Because of the complete elimination of all close-fits in the sensing mechanism of my governor, its reliability and life are greatly improved over conventional governors.

The compensation system above described may usefully be employed in very slow responding engines, or in any engine, to reduce the rate of the speeder spring as much as possible to achieve maximum possible amplification in the servo-system. In some applications it may be possible to eliminate the piston 138, which may be optionally achieved by closing the valve 152 so that the one governor may be set to give two types of compensation. With lever 153 revolved 90° in a clockwise direction, both sides of piston 138 drain to the sump. Then when the speed increases, the oil now trapped in chamber 136 resists the upward movement of the pilot valve and temporarily increases the droop until the oil bleeds out of chamber 136 past the clearance around the disc 126 and also past the valve 154 to the extent it is open. A decrease in speed produces the reverse action by effecting a temporary vacuum produced by the oil trapped in chamber 136 until oil flows thereto past the disc and valve 154 (if opened). In this manner stability is produced by the temporary speed droop instantly produced by the change in speed. If only this simplified type of compensation is desired, the piston 138, cylinder 140, passage 148, passage 150 between the valve 152 and chamber 144, and the valve 152 itself all may be omitted.

*Speed Droop or Reset Mechanism*

In some applications, such as for multiple engine control, it may be desirable to have selectable positive (normal) or negative (reverse) permanent speed droop. Accordingly, mechanism may optionally be included in the governor of the present invention to provide such speed droop selection or, as it is sometimes referred to, reset control. Referring to FIGS. 1 and 2, a rod extension 14a of the output shaft 14 projects slidably through the end wall 142 to actuate a bell crank 160 by means of a pin 162 carried by extension 14a and slidable in a slot 164 of the bell crank. The bell crank transmits movements of the extension 14a to a shaft 166 slidable in a bore of a boss 168 cast as part of the cover block 24. At its opposite end, shaft 166 carries a reset cam 178 which is thus moved back and forth as the servo-motor piston moves up and down in FIG. 1. A cam follower pin 194 is urged upwardly by a spring 196 to ride against the face of the reset cam 178, and the pin 194 is connected by a light spring 198 with an arm 70a of the bracket 70 to apply additional controlled forces acting on the pilot valve 62 as a function of the position of the servo-motor piston 82.

The reset cam 178 is angularly adjustable to give any desired characteristic to the forces acting on the pilot valve. Thus the forces can be increased or diminished as a result of movement of the reset cam to give a positive speed droop, or a reverse speed droop in which the engine speed would increase slightly with an increase in load. Referring to FIGS. 1 and 2, this adjustment may comprise mounting the cam 178 for angular movements about a pin 180 that is fixed to a cam block 176 which forms an extension of the shaft 166. The cam 178 is slotted as at 182 and an eccentric adjusting member 184 is disposed in a bore 185 of the cam block 176. An adjusting extension 184a of the eccentric member 184 projects through the slot in the cam and includes a slot to receive a screwdriver for rotary adjustment. Thus, rotation of the eccentric adjustment member causes the cam to assume various angular positions about the pin 180 so that its face may slant in either direction with respect to the axis of the shaft 166, as illustrated at A, B and C in FIG. 1. The desired position of angular adjustment may be retained by tightening a clamping screw 188 that projects through an angular slot 190 and is threaded into the cam block 176.

The operation of the speed droop mechanism is as follows: When the speed increases and the pilot valve effects a downward movement of piston 82, as above described, the cam 178 is moved rightwardly as viewed in FIG. 1, to move the pin 194 downwardly and reduce the upward force of spring 198. This action requires a slightly increased force from the flyweights to balance the speeder spring, which increased force is effected by a slight increase in speed (as the load reduces), so that a positive speed droop is produced. When the speed decreases as load is added, the reverse action occurs still along this normal droop curve. The cam is contoured to give any desired shape of the speed droop or loading curve. The cam may be moved to the angular position such as at B and contoured to give an isochronous calibration. Then when revolved to the position at A, a normal droop will be effected, and at angular position at C a reverse droop will be produced.

The governor can be set to shut off the engine by revolving the clock spring counterclockwise until all the force of the spring is removed from the pilot valve. Then the force of the reset spring 198 and any slight force from the flyweights at idle move the pilot valve completely in its upward direction, as viewed in FIG. 1, so that the piston 82 moves into its maximum downward position to shut off the fuel to the engine.

*Modified Forms, FIGS. 3–7*

Figure 3:
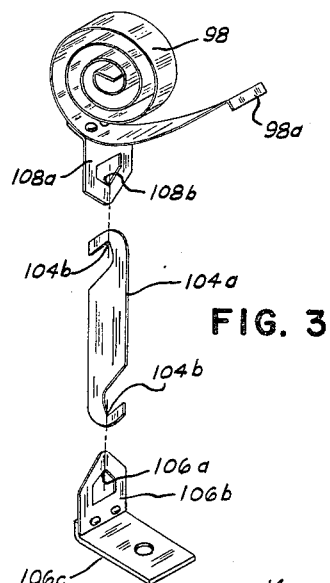
FIG. 3 is an exploded perspective view of one form of clock-type speeder spring used in the present invention.

FIG. 3 shows a modified form of the clock spring 98, in which the knife-edge member 100 of FIG. 1 is replaced by merely bending the end of the spring material 98a downwardly, and a knife-edge link 104a is shown in place of the wire 104 of FIG. 1 to connect the bracket 106 with the clock spring. Any suitable knife-edge link may be used to provide the desired frictionless connection, but in FIG. 3 there is shown by way of example an L-shaped bracket 108a secured to the clock spring and having an aperture with a V-shaped notch 108b adapted to engage a similar V-notch 104b disposed at each end of the link 104a. The other end of link 104a is formed to engage a V-notch 106a in an aperture provided in a member 106b suitably secured to a bracket 106c which is secured to the control section 20, or other fixed support, as is bracket 106 in FIG. 1. The members 108a, 104a, and 106b are illustrated as made of very thin sheet metal, such as .005–.008", to provide the desired frictionless knife-edge action. These members may be made of thicker metal if desired, providing suitable knife-edges are ground or otherwise formed at the V-notches 108b, 104b, and 106a. The fixed support 106c may also be mounted above the clock spring 98 with a pair of fingers projecting downwardly, as viewed in FIG. 3, to engage suitable knife-edge connections secured to the lower portion of the outer coil of the clock spring in place of bracket 108a. This reversal of the knife-edge construction would not change the inventive concept illustrated in FIGS. 1 and 3 in any way, but is mentioned merely to point out that a compression knife-edge construction may be used equally well as the tension knife-edge construction illustrated in FIG. 3.

Figure 4:
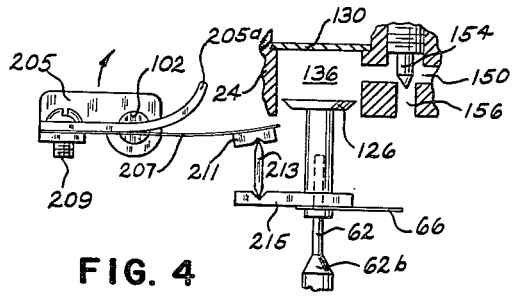
FIG. 4 is a fragmentary elevational view of a modified speeder spring and compensating member.

FIG. 4 shows a modified form of speeder spring which may be used in the present invention if the spring rate does not have to be as low as is possible with a clock spring. In FIG. 4, elements corresponding to the same elements of the governor of FIG. 1 are so indicated. Referring to FIG. 4 the speeder spring shaft 102 has a bracket 205 secured thereto. The bracket includes a guide portion bent perpendicularly and having a guide strip 205a bent upwardly, as viewed in FIG. 4 to a predetermined contour. A thin sheet metal leaf spring 207 acts as the speeder spring and is secured at one end to the bracket 205 by suitable fastening means, such as screws 209 adjacent the guide strip 205a. The other end of the leaf spring carries a block 211 suitably secured thereto as by soldering and having a V-shaped knife-edge-groove disposed to act on a knife-edge member 213. The knife-edge member rests in a similar knife-edge groove in a block 215 secured between the leaf spring 66 and the disc member 126, all suspended for frictionless movements by the leaf springs 64 and 66, FIG. 1. As the shaft 102 is revolved in a clockwise direction, as viewed in FIG. 4, the spring 207 wraps around the guide strip 205a so that a greater downward force is applied to the pilot valve for higher-speed operation. Also, the effective length of the leaf spring 207 is reduced so that its rate is increased. The guide strip 205a is pre-bent in a contour to increase the rate substantially as a function of the square of the speed to correspond with the force rate produced by the flyweights. Any other desired change in rate may be produced by suitably contouring the guide strip which in a sense acts like a cam. This type of speeder ring is disclosed in more detail in my co-pending application Serial No. 683,318.

Another modification illustrated in FIG. 4 is that the compensating spring 110 shown in FIG. 1 is shown omitted and the compensating disc is secured directly to the pilot valve 62, as by pressing, as shown in FIG. 4. This does not provide the added rate of spring 110 when piston 138 (FIG. 1) moves downwardly following an increase in speed. Instead, the oil pressure produced by piston 138 acts directly on disc 126 to move the pilot valve back to its neutral position to stop the piston 82 from moving. For this construction, it may be necessary to provide larger clearance around disc 126 or a larger opening of valve 154 in order to let the oil escape fast enough. Hence, the omission of spring 110 does not change the principle from that shown in FIG. 1, but merely provides a different type of compensation. If the valve 152 is revolved to close conduit 150, then chamber 136 in cooperation with disc 126 and valve 154 acts as a dashpot for the pilot valve. This may be used when the amount of compensation required is small.

Figure 5:
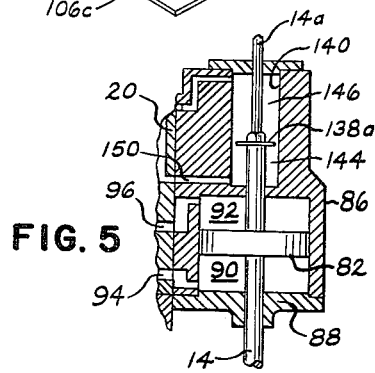
FIG. 5 is a fragmentary sectional view illustrating a modification of a portion of the compensating system of the governor.

FIG. 5 shows the servo-motor portion of the governor shown in FIG. 1, and the elements in FIG. 5 which are the same as in FIG. 1 are so numbered. The only modification in FIG. 5 is that a disc 138a, having perimetrical clearance with respect to the bore 140, replaces the piston 138 in FIG. 1. Since the disc 138a is maintained in alignment by the piston 82, the dimetrical disc clearance can be about .007–.030", for example. This construction removes the friction and close fits necessary with a piston usually used for this purpose. Although this friction is not critical (as is friction in the sensing mechanism) due to the large forces produced by the piston 82, the larger clearance around the disc removes the effect of gum and dirt deposits, and thus enhances the reliability of the device. Hence, the only sliding member in this governor would be the piston 82, and a diaphragm may be used here if desired, particularly if air pressure is used as the actuating fluid. For this construction it may be desirable to use a larger diameter for the disc 138a, since oil must bleed past its clearance, in addition to the bleed past the disc 126 and valve 154.

Figure 6:
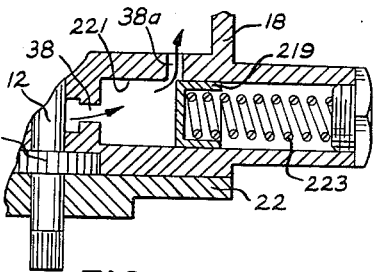
FIG. 6 is a fragmentary sectional view showing a modified form of pressure regulator that may be used in the present invention to control the supply pressure.

FIG. 6 illustrates an optional type of pressure regulator that may be used in place of the ball valve regulator of FIG. 1. In FIG. 6, a piston 219 is slidable in a bore 221 and is biased by a spring 223 to balance the oil pressure acting rightwardly on the piston, as viewed in FIG. 6. As the pressure increases, the piston moves to the right to increase the port opening of conduit 38a so that oil escapes until the pressure is restored. If the pressure decreases, the piston reduces the port opening of conduit 38a to restore the regulated pressure. If there is a sudden demand of oil beyond the pump capacity, the piston quickly is moved all the way to the left, as viewed in FIG. 6, to supply oil at only a slightly reduced pressure, since the spring 223 is preferably long and of low rate. Thus, this regulator may also act as an accumulator. However, for this governor it is better to provide a pump with sufficient capacity that the regulator can maintain a regulated pressure even during the periods of largest demand on the pump.

Any other type of sensing means to produce forces as a function of speed may be employed in the present invention without changing the scope thereof. It is highly desirable, however, that the means producing forces acting on the pilot valve be frictionless, as is the flyweight shown in FIG. 1. For example, a flexible diaphragm may act on the pilot valve by using the centrifugal-liquid sensing unit disclosed in my said co-pending patent application Serial No. 683,318.

In addition, the controller principle disclosed herein may be employed equally well with frictionless sensing means to regulate any other controlled condition, such as temperature, pressure, humidity, position of a member, liquid level, attitude (such as an airplane, missile or space vehicle), velocity of fluids, viscosity, acceleration, altitude, or any other condition to be controlled.

Figure 7:
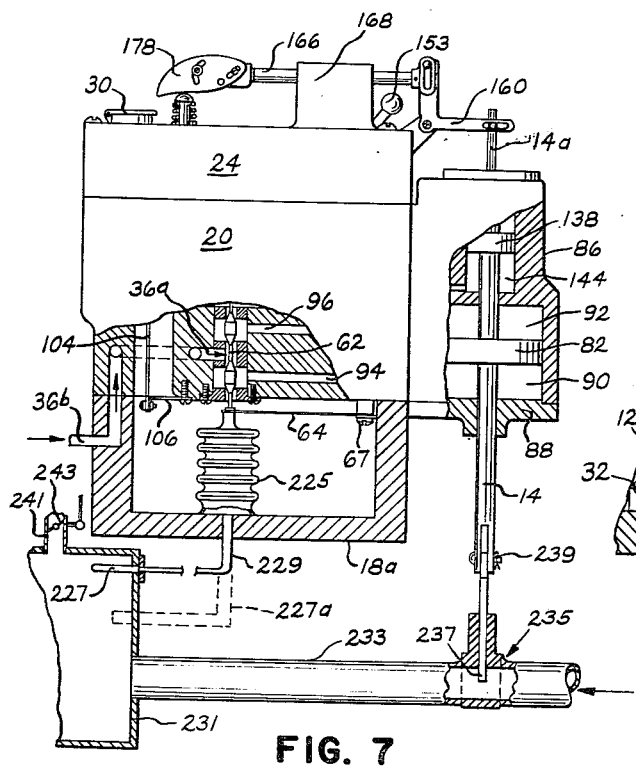
FIG. 7 is a somewhat diagrammatic view with parts in section showing the controller system of the present invention applied to regulate a different controlled condition, such as temperature.

FIG. 7 shows one example of such application in the form of a temperature (or pressure) controller. In FIG. 7 the control section 20, cover block 24, and servomotor 86, with all mechanism included therein are as shown in FIG. 1. Hence, the elements in FIG. 7 that correspond to those in FIG. 1 are so numbered. In FIG. 7, the centrifugal flyweight section 18 has been replaced with a temperature-sensing section 18a. The casing has secured thereto a metallic bellows or diaphragm 225 which is secured at its free end to the pilot valve 62 for frictionless movements therewith; hence the free end of the bellows is also supported by the leaf springs 64 and 66. The interior of the bellows communicates with a temperature bulb 227 connected by a tube 229, all sealed together and filled with a gas such as nitrogen. A vessel 231 contains a fluid, such as water, to be heated to a regulated temperature by a heating agent, such as steam, directed to the interior of the vessel by a pipe 233. The steam flow is controlled by a large gate valve 235 having a slidable gate 237 connected to the output shaft 14 of the controller. An outlet passage 241 may be provided at the top (as shown) or bottom, and a valve 243 may be provided to control the flow through the vessel if desired. Any power fluid, such as air, oil, etc., under pressure is supplied through passage 36b to the pilot valve 62 through passage 36a.

In operation, as the regulated temperature of the contents of the vessel or space 231 increases, the bellows 225 expands and moves the pilot valve 62 upwardly, as shown in FIGS. 1 and 7, so that the piston 82 moves the gate downwardly to reduce the steam supply to the vessel. The action of the compensation system from piston 138 and the reset mechanism from extension shaft 14a is exactly the same as for the governor operation described above. If the temperature decreases, the bellows contracts, and the reverse action is produced to admit more heating or heat-producing fluid to restore the regulated temperature.

The controller above described may be used to control any temperature, such as the temperature of a furnace, in which the pipe 233 would supply fuel oil or a combustible gas. If the temperature bulb 227 is replaced by an open conduit, such as the dotted conduit 227a exposed to the pressure in the vessel 231, the bellows will sense pressure changes therein and hence will regulate the pressure in the vessel. An application of such pressure control would be the regulation of pressure in a boiler, and the device could control pressure in many other applications as well as any other controlled condition as above recited.

By virtue of the construction described above, the objects of the invention listed herein and numerous additional advantages are attained.

What I claim is:

1. In a governor device for a rotating machine having control means to regulate the rotary speed thereof the combination of means for effecting speed-regulating movements of said control means comprising, a pressure responsive member operatively connected to said control means for actuation thereof, a fluid circuit having a source of pressure fluid to produce a flow of fluid therethrough and communicating with said pressure responsive member, valve means in said circuit for directing fluid therein to and from said pressure responsive member for effecting regulating movements thereof, speed sensing means responsive to changes in the speed of the rotating machine to produce forces varying as a function of the speed thereof and acting on said valve means to effect movements thereof for effecting speed-controlling movements of said pressure responsive member and said control means, a fluid chamber having an aperture therein, means operatively connected to said pressure responsive member to produce temporary pressure in said chamber as a result of movements of said pressure responsive member, a pressure sensitive member disposed within said aperture to form a movable portion of a wall of said chamber, means to mount said pressure sensitive member and to position same to provide a predetermined clearance between the entire perimeter of said pressure sensitive member and an adjacent surface forming said aperture, said clearance passing the fluid producing said temporary pressure on said pressure sensitive member, said mounting means including substantially frictionless swingable means imparting rigidity in one direction acting to support said pressure sensitive member and maintain said perimetrical clearance in all positions of said member for substantial frictionless movements in a direction transverse to said first-named direction, said movements of said pressure producing means effected by speed-controlling movements of said pressure responsive member producing said temporary fluid pressure acting on said pressure sensitive member until dissipated through at least said perimetrical clearance for displacing said valve means in a direction to stop further movement of said pressure responsive member.

2. The combination of elements defined in claim 1, in which said valve means includes a valve body member and a mating member co-operable therewith, and substantially frictionless swingable means imparting rigidity in one direction acting to support one of said valve members for substantially frictionless movements in a direction transverse to said last-named direction by maintaining said supported valve member suspended within the fluid controlled thereby completely free of surface contact during operational movements thereof, and in which said speed sensing means to produce forces as a function of the speed of the machine includes susbtantially frictionless movable means acting on said supported valve member to effect movements thereof in response to changes in the speed of the machine, a substantially frictionless operative connection between said last named movable means and said supported valve member, and spring means operatively connecting said pressure sensitive member and said valve means, substantially frictionless means to connect one end of said spring means to said valve means, substantially frictionless means to connect the other end of said spring means to said pressure sensitive member for temporarily changing the total forces acting on said valve means, said spring means effecting said temporary change in force as a result of a change in position of said pressure responsive member, whereby the co-operative movements of all of said elements and means directly responsive to changes in speed are substantially frictionless.

3. The combination of elements defined in claim 2, in which said swingable means supporting said pressure sensitive member comprises a pair of spaced substantially parallel leaf spring members, and said swingable means supporting one of said valve members comprising another and separate pair of spaced substantially parallel leaf spring members.

4. The combination of elements defined in claim 1, and reset means operatively connected to said pressure responsive member and said control means for simultaneous movements therewith to produce forces acting on said valve means and varying as a function of the position of said control means to provide a predetermined speed droop as the control means moves throughout its range of travel during governor operation.

5. The combination of elements defined in claim 1, in which said valve means includes a valve body member and a mating member co-operable therewith, and substantially frictionless swingable means imparting rigidity in one direction acting to support one of said valve members for substantially frictionless movements in a direction transverse to said last-named direction by maintaining said supported valve means suspended within the fluid controlled thereby completely free of surface contact other than fluid contact during operational movements thereof.

6. In a governor device for a rotating machine having control means to regulate the rotary speed thereof the combination of means for effecting speed-regulating movements of said control means comprising, a pressure responsive member operatively connected to said control means for actuation thereof, a fluid circuit having a source of pressure fluid to produce a flow of fluid therethrough and communicating with said pressure responsive member, valve means in said circuit for directing fluid therein to and from said pressure responsive member for effecting regulating movements thereof, speed sensing means responsive to changes in the speed of the rotating machine to produce forces varying as a function of the speed thereof and acting on said valve means to effect movements thereof for effecting speed-controlling movements of said pressure responsive member and said control means, a fluid chamber having an aperture therein, means operatively connected to said pressure responsive member to produce temporary pressure in said chamber as a result of movements of said pressure responsive member, a pressure sensitive member disposed within said aperture to form a movable portion of a wall of said chamber, means to mount said pressure sensitive member and to position same to provide a predetermined clearance between the entire perimeter of said pressure sensitive member and an adjacent surface forming said aperture, said clearance passing the fluid producing said temporary pressure on said pressure sensitive member, said mounting means including substantially frictionless swingable means imparting rigidity in one direction acting to support said pressure sensitive member and maintain said perimetrical clearance in all positions of said member for substantially frictionless movements in a direction transverse to said first-named direction, and spring means operatively connecting said pressure sensitive member and said valve means, one end of said spring means being connected to said valve means and the other end of said spring means being connected to said pressure sensitive member, for temporarily changing the total forces acting on said valve means, said spring means effecting said temporary change in force as a result of a change in position of said pressure responsive member and said pressure producing means to produce said temporary fluid pressure acting on said pressure sensitive member until dissipated through at least said perimetrical clearance for displacing said valve means in a direction to stop further movement of said pressure responsive member.

7. In a governor device for a rotating machine having control means to regulate the rotary speed thereof, the combination of means for effecting speed-regulating movements of said control means comprising, a pressure responsive member operatively connected to said control means for actuation thereof, a fluid circuit having a source of pressure fluid to produce a flow of fluid therethrough and communicating with said pressure responsive member, valve means in said circuit for controlling the pressures therein acting on said pressure responsive member for effecting regulating movements thereof, said valve means including a valve body member and a mating member cooperable therewith, substantially frictionless swingable means imparting rigidity in one direction acting to support one of said valve members for substantially frictionless movements in a direction transverse to said first-named direction by maintaining said supported valve member suspended within the fluid controlled thereby completely free of surface contact during operational movements thereof, speed-sensing means responsive to changes in the speed of the rotating machine to produce forces varying as a function of the speed thereof and including substantially frictionless movable means acting on said supported valve member to effect movements thereof in response to changes in the speed of the machine for effecting speed-controlling movements of said pressure responsive member and said control means, a susbtantially frictionless operative connection between said last-named movable means and said supported valve member, and a spiral spring biasing said supported valve member to produce forces opposing said forces produced by said speed sensing means and having substantially frictionless connection with said valve means, and substantially frictionless swingable means connected to a portion of said spiral spring and acting to constrain said portion from moving in a direction opposite to the direction of said biasing force due to the reaction thereof for preventing the coils of said spiral spring from contacting each other as said spring is wound to select the governed speed and for accommodating without friction said speed-responsive movements of said supported valve member.

8. In a self regulating control mechanism for automatically controlling a variable condition the combination of, control means to regulate said controlled condition, a pressure responsive member operatively connected to said control means for actuation thereof, a fluid circuit having a source of pressure fluid to produce a flow of fluid therethrough and communicating with said pressure responsive member, valve means in said circuit for controlling the pressure therein acting on said pressure responsive member for effecting regulating movements thereof, sensing means responsive to changes in the controlled condition to produce forces varying as a function thereof and acting on said valve means to effect movements thereof for effecting controlled-condition-regulating movements of said pressure responsive member and said control means, a fluid chamber having an aperture therein, means operatively connected to said pressure responsive member to produce temporary pressure in said chamber as a result of movements of said pressure responsive member, a pressure sensitive member disposed within said aperture to form a movable portion of a wall of said chamber, means to mount said pressure sensitive member and to position same to provide a predetermined clearance between the entire perimeter of said pressure sensitive member and an adjacent surface forming said aperture, said clearance passing the fluid producing said temporary pressure on said pressure sensitive member, said mounting means including substantially frictionless swingable means imparting rigidity in one direction acting to support said pressure sensitive member and maintain said perimetrical clearance in all positions of said member for substantially frictionless movements in a direction transverse to said first-named direction, said movements of said pressure producing means effected by controlled-condition-regulating movements of said pressure responsive member producing said temporary fluid pressure acting on said pressure sensitive member until dissipated through at least said perimetrical clearance for displacing said valve means in a direction to stop further movement of said pressure responsive member.

9. The combination of means defined in claim 8, and said pressure sensitive member being separately movable with respect to said valve means, and a spring operatively connected at one end to said valve means and at its other end to said pressure sensitive member, for temporarily changing the total forces acting on said valve means, said spring means effecting said temporary change in force as a result of a change in position of said pressure responsive member and said pressure-producing means to produce said temporary fluid pressure acting on said pressure sensitive member until dissipated through at least said perimetrical clearance for displacing said valve means in a direction to stop further movement of said pressure responsive member.

10. The combination of elements defined in claim 9, and cam means operatively connected to said pressure responsive member and said control means for simultaneous movements therewith, spring means operatively connected to said valve means to apply forces acting thereon, and said cam means including means to effect a variation of said force of said last-named spring means as a function of the position of said pressure responsive member and said control means to provide a predetermined variation of said controlled condition as the control means moves throughout its range of travel during operation of said control mechanism.

11. The combination of elements defined in claim 8, and reset means operatively connected to said pressure responsive member and said control means for simultaneous movement therewith to produce forces acting on said valve means and varying as a function of the position of said control means to provide a predetermined variation of the controlled condition as the control means moves throughout its range of travel during operation of said mechanism.

12. In a self regulating control mechanism for automatically controlling a variable condition the combination of, control means to regulate said controlled condition, a pressure responsive member operatively connected to said control means for actuation thereof, a fluid circuit having a source of pressure fluid to produce a flow of fluid therethrough and communicating with said pressure responsive member, valve means in said circuit for controlling the pressure therein acting on said pressure responsive member for effecting movements thereof, said valve means including a valve body member and a mating member co-operable therewith, substantially frictionless swingable means imparting rigidity in one direction acting to support one of said valve members for substantially frictionless movements in a direction transverse to said first-named direction by maintaining said supported valve member suspended within the fluid controlled thereby completely free of surface contact during operational movements thereof, sensing means responsive to changes in the controlled condition to produce forces varying as a function thereof and acting on said supported valve member to effect movements thereof for effecting controlled-condition-regulating movements of said pressure responsive member and said control means, said sensing means including substantially frictionless movable means to transmit said forces acting on said supported valve member to effect movements thereof in response to changes in the controlled condition, a fluid chamber having an aperture therein, means operatively connected to said pressure responsive member to produce temporary pressure in said chamber as a result of movements of said pressure responsive member, a pressure sensitive member disposed within said aperture to form a movable portion of a wall of said chamber, means to mount said pressure sensitive member and to position same to provide a predetermined clearance between the entire perimeter of said pressure sensitive member and an adjacent surface forming said aperture, said clearance passing the fluid producing said temporary pressure on said pressure sensitive member, said mounting means including substantially frictionless swingable means imparting rigidity in one direction acting to support said pressure sensitive member and maintain said perimetrical clearance in all positions of said member for substantially frictionless movements in a direction transverse to said last-named direction, said movements of said pressure producing means effected by controlled-condition-regulating movements of said pressure responsive member producing said temporary fluid pressure acting on said pressure sensitive member until dissipated through at least said perimetrical clearance for displacing said valve means in a direction to stop further movement of said pressure responsive member, whereby the cooperative movements of all said elements and means directly responsive to changes in the controlled condition are substantially frictionless.

13. The combination of elements defined in claim 12 and a spiral spring biasing said supported valve member to produce forces opposing said forces produced by said sensing means and having a substantially frictionless connection with said valve means, and substantially frictionless swingable means connected to a portion of said spiral spring and acting to constrain said portion from moving in a direction opposite from the direction of said biasing force due to the reaction thereof for preventing the coils of said spiral spring from contacting each other as said spring is wound to select the valve of said controlled condition and for accommodating without friction said controlled-condition-responsive movements of said supoprted valve member.

14. The combination of elements defined in claim 12, in which said swingable means supporting said pressure sensitive member comprises a pair of spaced substantially parallel leaf spring members, and said swingable means supporting one of said valve members comprising another separate pair of spaced substantially parallel leaf spring members.

15. In a self regulating control mechanism for automatically controlling a variable condition the combination of, control means to regulate said controlled condition, a pressure responsive member operatively connected to said control means for actuation thereof, a fluid circuit having a source of pressure fluid to produce a flow of fluid therethrough and communicating with said pressure responsive member, valve means in said circuit for controlling the pressure therein acting on said pressure responsive member for effecting movements thereof, said valve means including a valve body member and a mating member co-operable therewith, substantially frictionless swingable means imparting rigidity in one direction acting to support one of said valve members for substantially frictionless movements in a direction transverse to said first-named direction by maintaining said supported valve member suspended within the fluid controlled thereby completely free of surface contact during operational movements thereof, sensing means responsive to changes in the controlled condition to produce forces varying as a function thereof and acting on said supported valve member to effect movements thereof for effecting controlled-condition-regulating movements of said pressure responsive member and said control means, said sensing means including substantially frictionless movable means to transmit said forces acting on said supported valve member to effect movements thereof in response to changes in the controlled condition, a fluid chamber having an aperture, means operatively connected to said pressure responsive member to produce temporary pressure in said chamber as a result of movements of said pressure responsive member, a pressure sensitive member disposed within said aperture to form a movable portion of a wall of said chamber, means to mount said pressure sensitive member and to position same to provide a predetermined clearance between the entire perimeter of said pressure sensitive member and an adjacent surface forming said aperture, said clearance passing the fluid producing said temporary pressure on said pressure sensitive member, said mounting means including substantially frictionless swingable means imparting rigidity in one direction acting to support said pressure sensitive member and maintain said perimetrical clearance in all positions of said member for substantially frictionless movements in a direction transverse to said last-named direction, and spring means operatively connecting said pressure sensitive member and said valve means for temporarily modifying the total forces acting on said valve means, said spring means effecting said temporary change in force as a result of a change in position of said pressure responsive member and said pressure producing means to produce said temporary fluid pressure acting on said pressure sensitive member until dissipated through at least said perimetrical clearance for displacing valve means in a direction to stop further movement of said pressure responsive member, whereby the co-operative movements of all said elements and means directly responsive to changes in the controlled condition are substantially frictionless.

16. The combination of elements defined in claim 8 in which said valve means includes a valve body member and a mating member co-operable therewith, and said pressure sensitive member being connected to one of said valve members to be carried thereby, and said substantially frictionless swingable means also acting to support said last named valve member for substantially frictionless movements in a direction transverse to said first-named direction by maintaining said supported valve member suspended within the fluid controlled thereby completely free of surface contact during operational movements thereof.

17. In a governor device for a rotating machine having control means to regulate the rotary speed thereof the combination of means for effecting speed-regulating movements of said control means comprising, a pressure responsive member operatively connected to said control means for actuation thereof, a fluid circuit having a source of pressure fluid to produce a flow of fluid therethrough and communicating with said pressure responsive member, valve means in said circuit for directing fluid therein to and from said pressure responsive member for effecting regulating movements thereof, speed sensing means responsive to changes in the speed of the rotating machine to produce forces varying as a function of the speed thereof and acting on said valve means to effect movements thereof for effecting speed-controlling movements of said pressure responsive member and said control means, means operatively connected to said pressure responsive member to apply a temporary force for modifying the valving action of said valve means as a result of movements of said control means, said temporary force dissipating when said control means is not in motion for displacing said valve means in a direction to stop further movement of said pressure responsive member to prevent overtravel thereof, said sensing means comprising a rotatable centrifugal flyweight device including a rotatable member, a pair of diametrically opposed weights, substantially frictionless swingable members connecting said rotatable member with said weights and acting to support each of said weights for substantially frictionless radial movements, bendable strip spring means connecting said weights and having a portion adapted to move axially in response to radial movements of said weights for producing said forces acting on said valve means for effecting speed-responsive movements thereof.

18. In a governor device for a rotating machine having control means to regulate the rotary speed thereof the combination of means for effecting speed-regulating movements of said control means comprising, a pressure responsive member operatively connected to said control means for actuation thereof, a fluid circuit having a source of pressure fluid to produce a flow of fluid therethrough and communicating with said pressure responsive member, valve means in said circuit for directing fluid therein to and from said pressure responsive member for effecting regulating movements thereof, speed sensing means responsive to changes in the speed of the rotating machine to produce forces varying as a function of the speed thereof and acting on said valve means to effect movements thereof for effecting speed-controlling movements of said pressure responsive member and said control means, said speed sensing means including substantially frictionless movable means acting on said valve means to effect movements thereof in response to changes in the speed of the machine, a fluid pressure sensitive member acting on said valve means to apply a temporary force acting thereon, means operatively-connected to said pressure responsive member to produce a temporary fluid pressure acting on said pressure sensitive member as a result of movements of said pressure responsive member and control means, orifice means associated with said pressure producing means to permit said temporary fluid pressure to dissipate when said control means is not in motion, said movements of said pressure responsive member as a result of movements of said valve means effecting said temporary pressure acting on said pressure sensitive member for producing said temporary force acting on said valve means to cause movement thereof in a direction to stop further movement of said pressure responsive member.

19. The combination of elements defined in claim 1, in which said sensing means comprises a rotatable centrifugal flyweight device including a rotatable member, a pair of diametrically opposed weights, substantially frictionless swingable members connecting said rotatable member with said weights and acting to support each of said weights for substantially frictionless radial movements, substantially frictionless flexible spring strip means connecting said weights and having a portion adapted to move axially in response to radial movements of said weights for producing said forces acting on said valve means for effecting speed-responsive movements thereof.

20. The combination of elements defined in claim 8, and a second fluid chamber communicating with said first-named fluid chamber, said pressure producing means being movable within said chamber to form a movable portion of a wall of said second chamber with predetermined clearance between the entire perimeter of said movable-wall-portion and an adjacent wall of said second chamber to prevent surface contact therewith.

21. The combination of elements defined in claim 8, in which said controlled condition is temperature, and said sensing means comprises temperature-responsive means including means producing said forces acting on said valve means in response to changes in the temperature of the medium being controlled.

22. The combination of elements defined in claim 8, in which said controlled condition is pressure, and said sensing means comprises pressure-responsive means including means producing said forces acting on said valve means in response to changes in the pressure of the medium being controlled.

23. In a control device for automatically regulating the temperature of a controlled medium the combination of, means to control the temperature of the controlled medium, a pressure responsive member operatively connected to said control means for actuation thereof, a fluid circuit having a flow of fluid therethrough and communicating with said pressure responsive member, valve means in said fluid circuit for controlling pressure therein acting on said pressure responsive member to effect movements thereof, said valve means including a valve body member and a mating member co-operable therewith, substantially frictionless swingable means imparting rigidity in one direction acting to support one of said valve members for substantially frictionless movements in a direction transverse to said first named direction by maintaining said valve member suspended within the fluid controlled thereby completely free of surface contact during operational movements thereof, substantially frictionless movable sensing means responsive to changes in temperature of the controlled medium and acting on said supported valve member to effect movements thereof for producing movements of said pressure responsive member and thereby amplified forces acting on said control means, substantially frictionless biasing means opposing the forces produced by said sensing means, whereby the co-operative movements of said supported valve member, said movable sensing means, and said biasing means are substantially frictionless to effect temperature regulating movements of said control means.

24. In a self-regulating control mechanism for automatically controlling a variable condition, the combination of, control means to regulate said controlled condition, a pressure responsive member operatively connected to said control means for actuation thereof, a fluid circuit having a source of pressure fluid to produce a flow of fluid therethrough and communicating with said pressure responsive member, valve means in said circuit for controlling the pressure therein acting on said pressure responsive member for effecting regulating movements thereof, said valve means including first and second co-operating valve elements having configuration to produce modulated pressures acting on said pressure responsive member and varying as a function of the position thereof, sensing means responsive to changes in the controlled condition to produce forces varying as a function thereof and acting on said valve means to effect movements thereof for effecting controlled-condition-regulating movements of said pressure responsive member said control means, and a spiral spring biasing said valve means to produce forces opposing said last named forces, and means connected to a portion of said spiral spring and acting to constrain said portion from moving in a direction opposite from the direction of said biasing force due to the reaction thereof for preventing the coils of said spiral spring from touching each other as said spring is wound to set the value of said controlled condition.

25. In a fluid device to operate a movable controlled member, the combination of a pressure responsive member operatively connected to said controlled member to effect movements thereof, a fluid circuit having a source of fluid pressure to produce a flow of fluid therethrough and communicating with said pressure responsive member, valve means including a movable valve member in said circuit to control pressures therein acting on said pressure responsive member to effect movements thereof in response to movements of said valve member, means acting on said valve member to apply forces thereon for affecting the positioning thereof, a fluid chamber having an aperture therein, said last-named force applying means including a pressure sensitive member disposed within said aperture to comprise a movable portion of a wall of said chamber, means to mount said pressure sensitive member to provide a predetermined clearance space between its perimetrical surface and the adjacent surface forming said aperture, the fluid which acts on said pressure sensitive member passing through said clearance space whenever a pressure differential exists on opposite sides of said member, said mounting means including substantially frictionless swingable leaf spring means imparting rigidity in one direction and acting to maintain said perimetrical clearance in all operative positions of said member for substantially frictionless movements in a direction transverse to said first-named direction, and second swingable leaf spring means imparting rigidity in one direction and acting to support said valve member for substantially movements in a direction transverse to said last-named direction by maintaining said valve member suspended within the fluid controlled thereby completely free of surface contact other than fluid contact during operational movements thereof.

26. In a self-regulating control mechanism for automatically controlling a variable condition the combination of, control means to regulate said controlled condition, a pressure responsive member operatively connected to said control means for actuation thereof, a fluid circuit having a source of pressure fluid to produce a flow of fluid therethrough and communicating with said pressure responsive member, valve means in said circuit for controlling the pressure therein acting on said pressure responsive member for effecting regulating movements thereof, sensing means responsive to changes in the controlled condition to produce forces varying as a function thereof and acting on said valve means to effect movements thereof for effecting controlled-condition-regulating movements of said pressure responsive member and said control means, a fluid chamber having an aperture therein, a pressure sensitive member acting on said valve means and disposed within said aperture to comprise a movable portion of a wall of said chamber, means to mount said pressure sensitive member and to position same to provide a predetermined clearance between its perimetrical surface and the adjacent surface forming said aperture, the fluid which acts on said pressure sensitive member passing through said clearance whenever a pressure differential exists on opposite sides of said member, said mounting means including a pair of spaced substantially parallel frictionless swingable means imparting rigidity in one direction acting to support said pressure sensitive member and maintain said perimetrical clearance in all positions of said member for substantially frictionless movements in a direction transverse to said first-named direction, said pressure responsive member including means to produce a temporary fluid pressure acting on said pressure sensitive member until dissipated through at least said perimetrical clearance for delaying movement of said valve means.

27. In a self-regulating control mechanism for automatically controlling a variable condition the combination of, control means to regulate said controlled condition, a pressure responsive member operatively connected to said control means for actuation thereof, a fluid circuit having a source of pressure fluid to produce a flow of fluid therethrough and including a branch circuit having a portion communicating with one side of said pressure responsive member, said fluid circuit including a second branch circuit having a portion communicating with the opposite side of said pressure responsive member, valve means including a movable valve member having portions disposed in each of said branch circuits to control the pressures in said branch circuits acting on said opposite sides of said pressure responsive member, said movements of said valve member in one direction increasing the pressure acting on said one side of said pressure responsive member while decreasing the pressure acting on said other side of said pressure responsive member, and conversely, sensing means responsive to changes in the controlled condition to produce forces varying as a function thereof and acting on said valve means to effect movements thereof for effecting controlled-condition-regulating movements of said pressure responsive member and said control means, a fluid chamber having an aperture therein, a pressure sensitive member disposed within said aperture to comprise a movable portion of a wall of said chamber, means to mount said pressure sensitive member and to position same to provide a predetermined clearance between its perimetrical surface and the adjacent surface forming said aperture, means operatively connected to said pressure responsive member to product temporary pressure in said chamber as a result of movements of said pressure responsive member, the fluid which acts on said pressure sensitive member passing through said clearance whenever said temporary pressure differential exists on opposite sides of said member, said mounting means including substantially frictionless swingable means imparting rigidity in one direction acting to support said pressure sensitive member and maintain said perimetrical clearance in all positions of said member for substantially frictionless movements in a direction transverse to said first-named direction, said movements of said pressure producing means effected by controlled-condition-regulating movements of said pressure responsive member producing said temporary fluid pressure acting on said pressure sensitive member until dissipated through at least said perimetrical clearance for displacing said valve means in a direction to stop further movement of said pressure responsive member.

28. In a governor device for a rotating machine having control means to regulate the rotary speed thereof, the combination of means for effecting movement of said control means comprising, a pressure responsive member operatively connected to said control means for actuation thereof, a fluid circuit having a source of pressure fluid to produce a flow of fluid therethrough and communicating with said pressure responsive member, valve means in said circuit for controlling the pressures therein acting on said pressure responsive member for effecting regulating movements thereof, said valve means including a valve body member and a mating member cooperable therewith, substantially frictionless swingable means imparting rigidity in one direction acting to support one of said valve members for substantially frictionless movements in a direction transverse to said first-named direction by maintaining said supported valve member suspended within the fluid controlled thereby completely free of surface contact during operational movements thereof, speed-sensing means responsive to changes in the speed of the rotating machine to produce forces varying as a function of the speed thereof and acting on said supported valve member to effect movements thereof in response to changes in the speed of the machine for effecting speed-controlling movements of said pressure responsive member and said control means, and a spiral spring biasing said supported valve member to produce forces opposing said forces produced by said speed sensing means and having substantially frictionless connection with said valve means, and substantially frictionless swingable means connected to a portion of said spiral spring and acting to constrain said portion from moving in a direction opposite to the direction of said biasing force due to the reaction thereof for preventing the coils of said spiral spring from contacting each other as said spring is wound to select the governor speed and for accommodating without friction said speed-responsive movements of said supported valve member.

29. In a self-regulating control mechanism for automatically controlling a variable condition the combination of, control means to regulate said controlled condition, a pressure responsive member operatively connected to said control means for actuation thereof, a fluid circuit having a source of pressure fluid to produce a flow of fluid therethrough and communicating with said pressure responsive member, valve means in said circuit for controlling the pressure therein acting on said pressure responsive member for effecting regulating movements thereof, said valve means including a movable valve member, substantially frictionless swingable means including a pair of spaced substantially parallel leaf spring members imparting rigidity in one direction acting to support said movable valve member for substantially frictionless movements in a direction transverse to said first-named direction by maintaining said supported valve member suspended within the fluid controlled thereby completely free of surface contact other than fluid contact during operational movements thereof, sensing means responsive to changes in the controlled condition to produce forces varying as a function thereof and acting on said supported valve member to effect movements thereof for effecting controlled-condition-regulating movements of said pressure responsive member and said control means, a spiral spring biasing said valve member to produce forces opposing said forces produced by said sensing means and having substantially frictionless operative connection with said valve means, and substantially frictionless swingable means connected to a portion of said spiral spring and acting to constrain said portion from moving in a direction opposite to the direction of said biasing force due to the reaction thereof for preventing the coils of said spiral spring from contacting each other as said spring is wound to select the desired value of the controlled condition and for accommodating without friction said controlled-condition-responsive movements of said supported valve member.

30. In a self-regulating control mechanism for automatically controlling a variable condition the combination of, control means to regulate said controlled condition, a pressure responsive member operatively connected to said control means for actuation thereof, a fluid circuit having a source of pressure fluid to produce a flow of fluid therethrough and communicating with said pressure responsive member, valve means in said circuit for controlling pressure therein acting on said pressure responsive member for effecting regulating movements thereof, sensing means responsive to changes in the controlled condition to produce forces varying as a function thereof and acting on said valve means to effect movements thereof for effective controlled-condition-regulating movements of said pressure responsive member and said control means, compensating means operated by said pressure responsive member adapted to produce a temporary force acting on said valve means as a result of movements of said control means, means associated with said compensating means to enable said temporary force to dissipate when said control means is not in motion for displacing said valve means in a direction to stop further movement of said pressure responsive member, and reset means including a cam operatively connected to said pressure responsive member and said control means for simultaneous movement therewith to produce forces acting on said valve means and varying as a function of the position of said control means to provide a predetermined variation of said controlled condition as the control means moves throughout its range of travel during operation of said mechanism, said reset means including a support for said cam, and means to revolve said cam for angular movements in relation to said support to regulate the amount of said controlled variation of the desired value of said controlled condition produced by said mechanism.

31. The combination of elements defined in claim 15, and said first-named swingable means including a pair of spaced substantially parallel leaf spring means, and said second-named swingable means including another pair of spaced substantially parallel leaf spring means.

32. The combination of means defined in claim 15, and said first named swingable means including a pair of spaced substantially parallel leaf spring means, and said second named swingable means including another pair of spaced substantially parallel leaf spring means, and a frictionless spiral spring biasing said supported valve member to produce forces opposing said forces produced by said sensing means and having a substantially frictionless connection with said valve means, and substantially frictionless swingable means connected to a portion of said spiral spring and acting to constrain said portion from moving in a direction opposite from the direction of said biasing force due to the reaction thereof for preventing the coils of said spiral spring from contacting each other as said spring is wound to select the operating value of said controlled-condition and for accommodating without friction said speed-responsive movements of said supported valve member.

33. The combination of elements defined in claim 27, and a frictionless spring biasing the forces produced by said sensing means to select the desired value of said controlled condition, a frictionless compensating spring operatively connecting said pressure sensitive member and said valve means to transmit thereto temporary forces produced on said pressure sensitive member by said temporary pressure, and said frictionless swingable supporting means including a pair of spaced substantially parallel leaf spring members.

34. In a self-regulating control mechanism for automatically controlling a variable condition, the combination of, control means to regulate said controlled condition, a pressure responsive member operatively connected to said control means for actuation thereof, a fluid circuit having a source of pressure fluid to produce a flow of fluid therethrough and communicating with said pressure responsive member, valve means in said circuit for controlling the pressure therein acting on said pressure responsive member for effecting regulating movements thereof, leaf spring means to support said valve means for frictionless operative movement thereof, sensing means including frictionless movable means responsive to changes in the controlled condition to produce forces varying as a function thereof and acting on said valve means to effect movements thereof for effecting controlled-condition-regulating movements of said pressure responsive member and said control means, a frictionless spiral spring biasing said valve means to produce forces opposing said last named forces, and frictionless flexible strip spring means connected to a portion of said spiral spring and acting to constrain said portion from moving in a direction opposite from the direction of said biasing force due to the reaction thereof for preventing the coils of said spiral spring from touching each other as said spring is wound to select the value of said controlled condition.

35. The combination of means defined in claim 1, in which said valve means includes a movable member, and a pair of substantially parallel leaf spring means imparting rigidity in all except one direction acting to support said valve member for substantially frictionless movements in said one direction, and in which said sensing means comprises a rotatable centrifugal flyweight device including a rotatable member, a pair of diametrically opposed weights, substantially frictionless swingable members connecting said rotatable member with said weights and acting to support each of said weights for substantially frictionless radial movements, substantially frictionless flexible spring strip means connecting said weights and having a portion adapted to move axially in response to radial movements of said weights for producing said forces acting on said valve means for effecting speed-responsive movements thereof, and said axially movable portion including means to transmit said last-named forces to said valve member without friction and to utilize said rigidity of said leaf spring means to maintain said movable portion in substantially concentric relation to the rotary axis of said flyweight device.

36. The combination of elements defined in claim 1, in which said valve means includes a movable valve member, and a pair of spaced substantially parallel leaf spring members imparting rigidity in all except one direction acting to support said valve member for substantially frictionless movements in said one direction, and said substantially frictionless swingable means comprising another and separate pair of spaced substantially parallel leaf spring members for supporting said pressure sensitive member, separate and independent of said valve member.

37. The combination of elements defined in claim 8, in which said valve means includes a movable valve member, the configuration of said valve member in relation to other elements of said valve means being adapted to produce modulated pressures acting on at least one side of said pressure responsive member varying as a function of the position of said valve member.

38. The combination of elements defined in claim 12, and said fluid circuit includes two fluid restrictions, said pressure responsive member communicating on at least one side thereof with said circuit at a point between said two restrictions, and said supported valve member being adapted to cooperate with at least one of said restrictions to vary gradually the restrictive effect thereof for modulating the pressures acting on said pressure responsive member as a function of the position of said supported valve member.

References Cited in the file of this patent

UNITED STATES PATENTS

| | | |
|---|---|---|
| 2,379,304 | Kalin | June 26, 1945 |
| 2,496,284 | Gillespie | Feb. 17, 1950 |
| 2,560,758 | Burritt | July 17, 1951 |
| 2,561,588 | Muzzey et al. | July 24, 1951 |
| 2,627,401 | Harada | Feb. 3, 1953 |
| 2,714,000 | O'Connor | July 26, 1955 |
| 2,742,879 | Kiser | Apr. 24, 1956 |
| 2,812,746 | Reggio | Nov. 12, 1957 |
| 2,887,997 | Thorner | May 26, 1959 |
| 2,887,998 | Thorner | May 26, 1959 |
| 2,887,999 | Thorner | May 26, 1959 |